(12) United States Patent
Mendez

(10) Patent No.: US 11,118,945 B2
(45) Date of Patent: Sep. 14, 2021

(54) APPARATUS FOR MOUNTING AND ALIGNING AN ANGULAR POSITION SENSOR TO A ROTATING SHAFT

(71) Applicant: Jorge Armando Mendez, Williamsville, NY (US)

(72) Inventor: Jorge Armando Mendez, Williamsville, NY (US)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 0 days.

(21) Appl. No.: 17/029,392

(22) Filed: Sep. 23, 2020

(65) Prior Publication Data
US 2021/0096007 A1    Apr. 1, 2021

Related U.S. Application Data

(60) Provisional application No. 62/906,807, filed on Sep. 27, 2019.

(51) Int. Cl.
*G01D 11/30* (2006.01)
*G01D 5/00* (2006.01)

(52) U.S. Cl.
CPC ............... *G01D 11/30* (2013.01); *G01D 5/00* (2013.01)

(58) Field of Classification Search
CPC .................................. G01D 11/30; G01D 5/00
See application file for complete search history.

(56) References Cited

U.S. PATENT DOCUMENTS

2017/0314969 A1\* 11/2017 Ausserlechner ....... G01D 5/147

\* cited by examiner

*Primary Examiner* — Jamel E Williams
(74) *Attorney, Agent, or Firm* — Robert J. Hampsch

(57) ABSTRACT

An adjustable device for mounting an angular position sensor such as an encoder to a large diameter rotating shaft such as a motor shaft is provided. The adjustable device includes a specially configured alignment plate, a coupling shaft, a spherical joint, and a plurality of fixing bolts and adjustment screws that are disposed symmetrically on the adjustment plate and radially offset from the shaft rotation axis. The fixing bolts and adjustment screws are generally disposed the same radial distance from the central rotation axis.

6 Claims, 7 Drawing Sheets

APPARATUS FOR MOUNTING AND ALIGNING AN ANGULAR POSITION SENSOR TO A ROTATING SHAFT

CROSS REFERENCE TO RELATED APPLICATIONS

This application claims the benefit of and/or priority to U.S. provisional patent application Ser. No. 62/906,807 filed Sep. 27, 2019 the disclosure of which is incorporated by reference herein.

TECHNICAL FIELD

The present invention relates to a device for mounting and aligning an angular position sensor to a rotating shaft on equipment such as motors, and more particularly to an alignment plate for axially aligning an angular position sensor, such as an encoder to a large diameter motor shaft.

BACKGROUND

Applications that require use of angular position sensors such as encoders, resolvers, etc. to be mounted on rotating shafts such as motor shafts often confront challenges for reliably mounting the angular position sensor on the rotating shaft. These challenges or problems may arise in situations where the rotating shaft diameter is larger than the shaft of the sensor, or where the end face of the rotating shaft is not orthogonal to the shaft axis, or where the free end of the motor is not a solid shaft. Also, in many situations where the angular position sensor is mounted on a motor shaft with a single screw or attachment means, the reliability of the sensor mounting is diminished over time as the single screw tends to over-tighten or loosen due to the angular inertia imparted to the coupling.

What is needed therefore is a device for mounting and aligning an angular position sensor to a rotating shaft that addresses the above-identified problems. More particularly, what is needed is a device for mounting and aligning an angular position sensor to a motor shaft that is adaptable to the various installation arrangements requiring coupling of the angular position sensor to the motor shaft and that does not fail as a result of the angular inertia imparted to the coupling.

SUMMARY OF THE INVENTION

The present invention may be characterized as a device for mounting an angular position sensor to a rotating shaft comprising: (i) an alignment plate configured to be affixed to an end face of the rotating shaft, the alignment plate having a central aperture; (ii) a coupling shaft disposed through the central aperture of the alignment plate, the coupling shaft having a first end configured to engage the end face of the rotating shaft and a second end configured to engage with the angular position sensor; (iii) a spherical joint coupled to first end of the coupling shaft and centrally disposed in contact with the end face of the rotating shaft; and (iv) a plurality of adjustment screws extending from the alignment plate towards the end face of the rotating shaft. In preferred embodiments, the diameter of the coupling shaft is less than the diameter of the rotating shaft.

In some embodiments, the alignment plate preferably is constructed or configured with a central annular section and a plurality of peripheral sections extending radially outward from the central annular section, the plurality of peripheral sections each having one or more apertures. The alignment plate is affixed to the end face of the rotating shaft via a plurality of bolts which are disposed through the apertures in the plurality of peripheral sections of the alignment plate to the end face of the rotating shaft to affix the alignment plate to the end face of the rotating shaft.

In such embodiments, the angular position sensor is rotationally aligned with the rotating shaft via movement of the adjusting screws which are disposed through other apertures in the plurality of peripheral sections of the alignment plate and configured to engage the end face of the rotating shaft.

BRIEF DESCRIPTION OF THE DRAWINGS

While the specification concludes with one or more claims specifically pointing out the subject matter that Applicant regards as the invention, it is believed that the invention will be better understood when taken in connection with the accompanying drawings in which:

DETAILED DESCRIPTION

Figure 1:
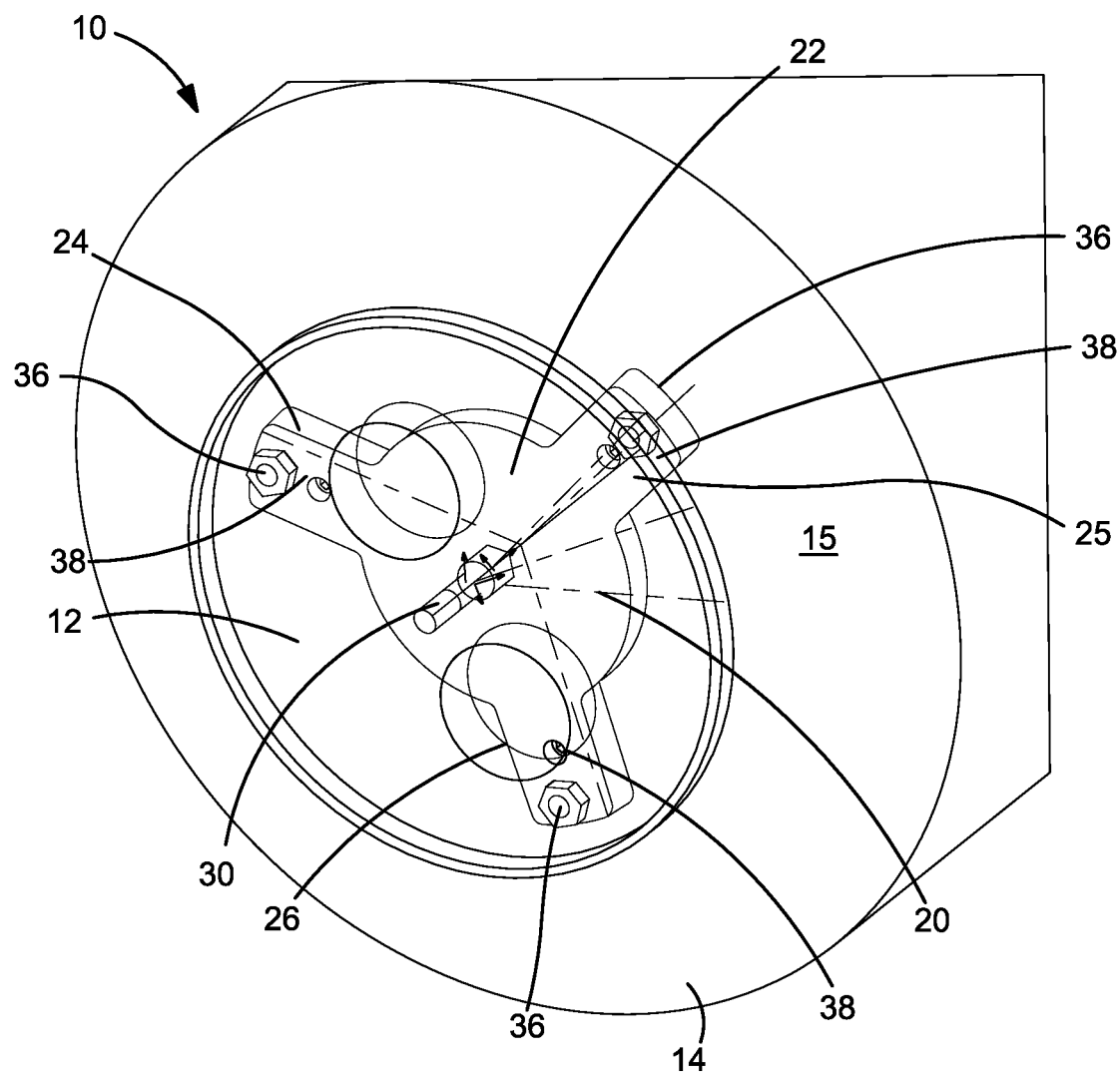
FIG. 1 depicts a partial perspective view of an assembly that includes a device for mounting and aligning an angular position sensor (e.g. encoder) to a rotating motor shaft in accordance with one embodiment of the present invention.
Figure 2:
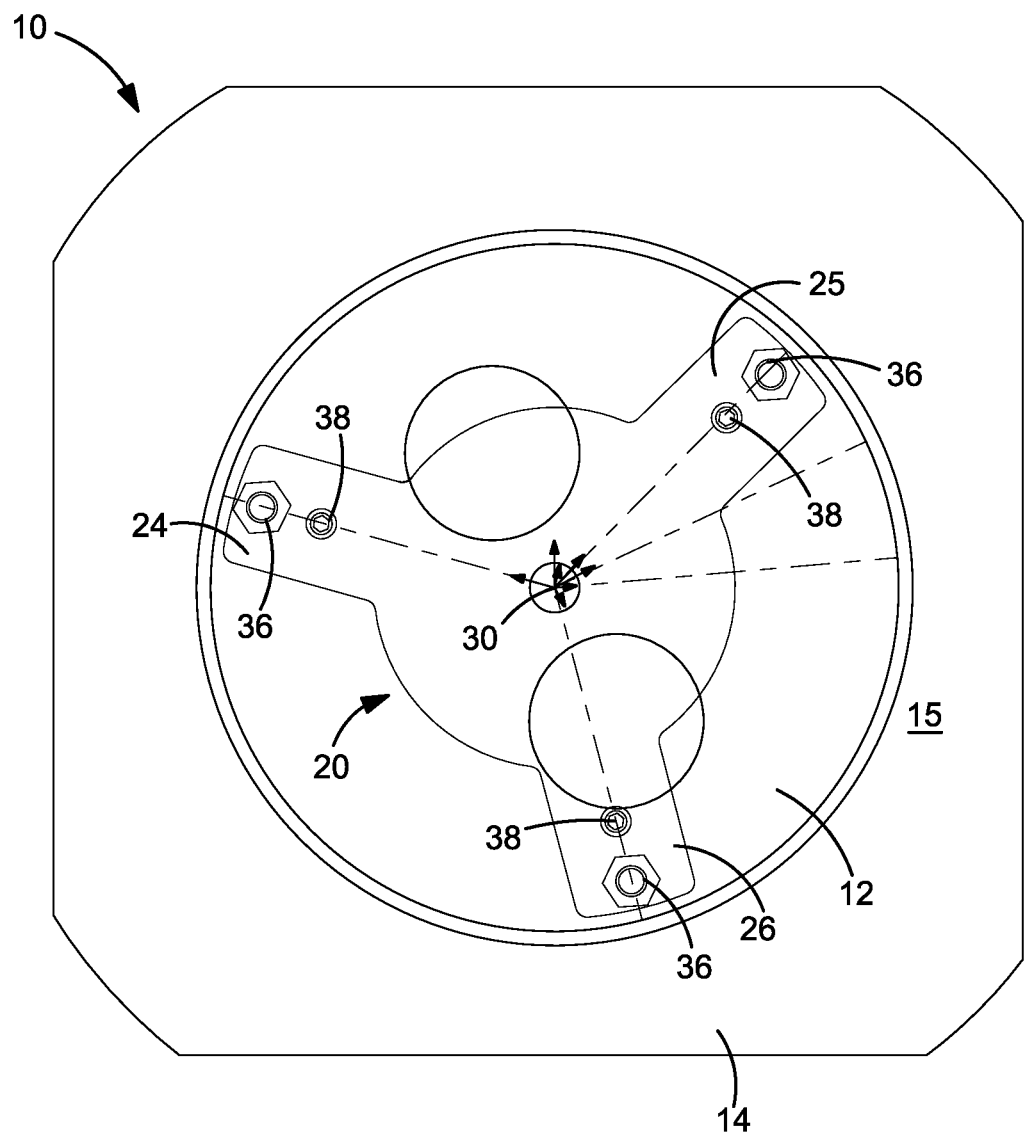
FIG. 2 is a front plan view of the assembly of FIG. 1 shown coupling the angular position sensor (e.g. encoder) to a large diameter motor shaft.
Figure 3:
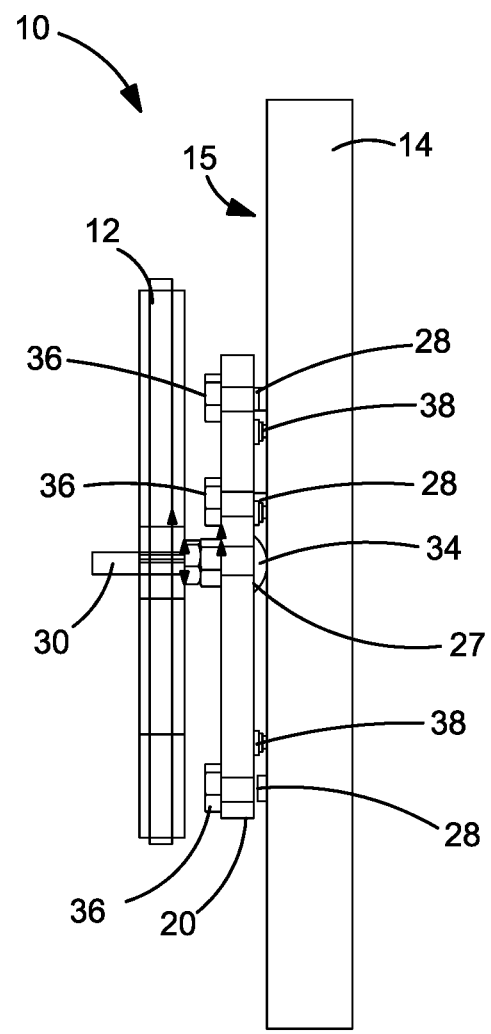
FIG. 3 is a cross-section view of the assembly of FIG. 1 shown coupling the angular position sensor (e.g. encoder) to a large diameter motor shaft.
Figure 4:
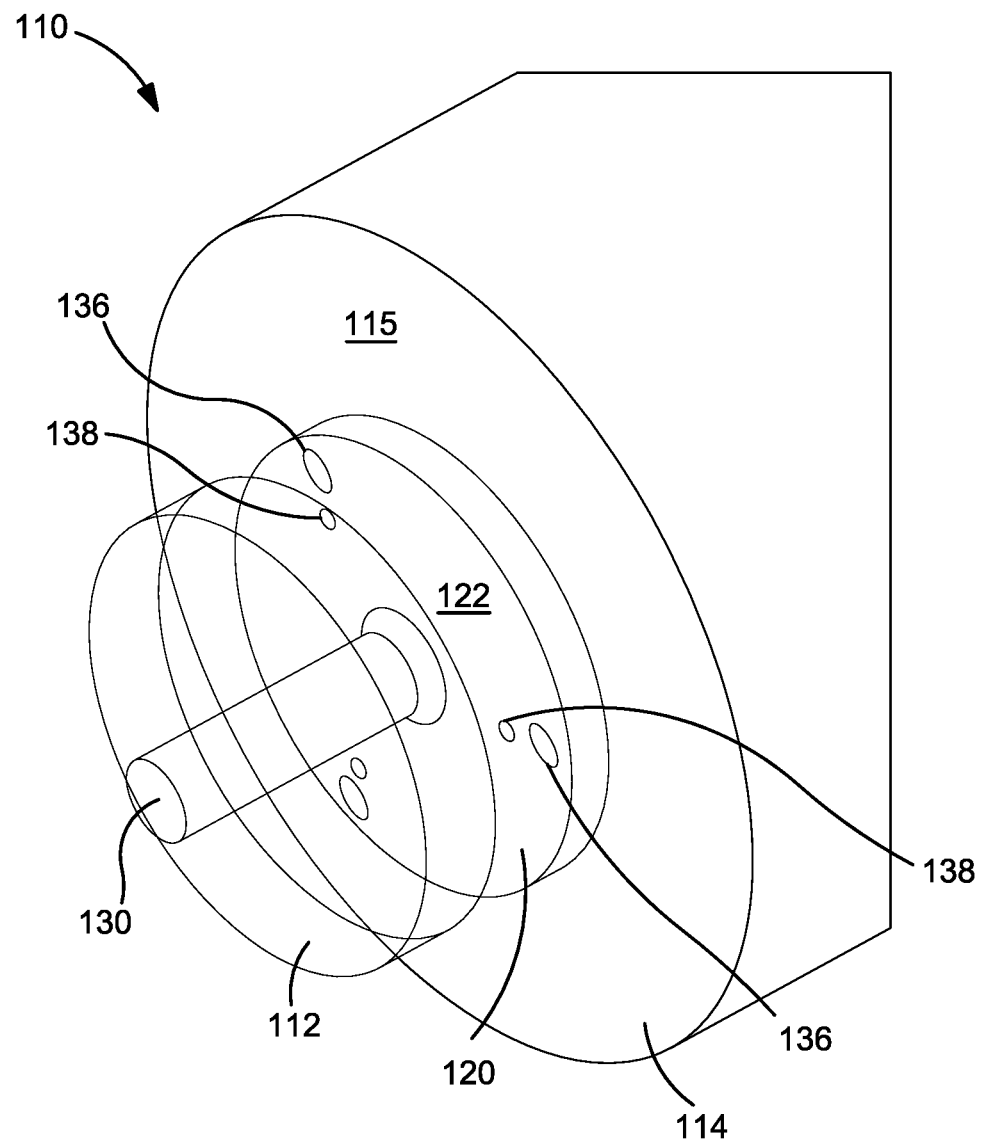
FIG. 4 depicts a partial perspective view of another assembly including an alternate embodiment of the device for mounting and aligning an angular position sensor to a rotating motor shaft.
Figure 5:
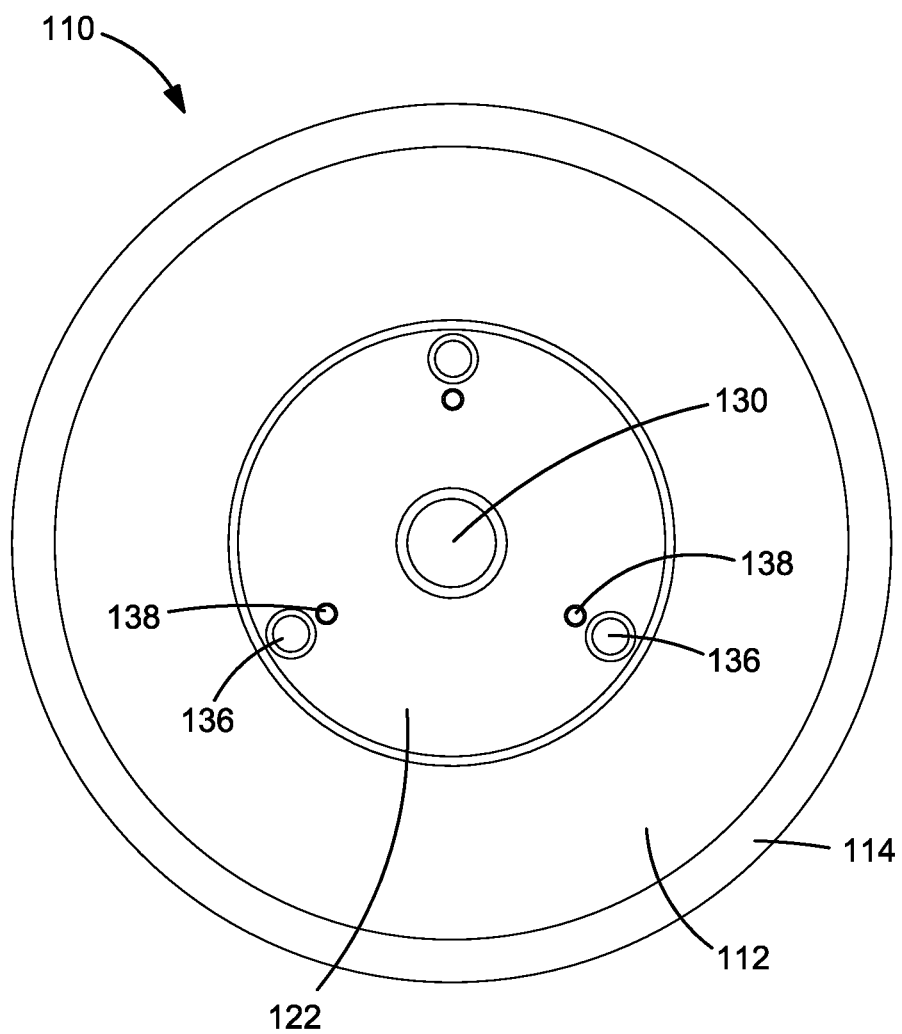
FIG. 5 is a front plan view of the device of FIG. 4 shown coupling the angular position sensor (e.g. encoder) to a large diameter motor shaft.
Figure 6:
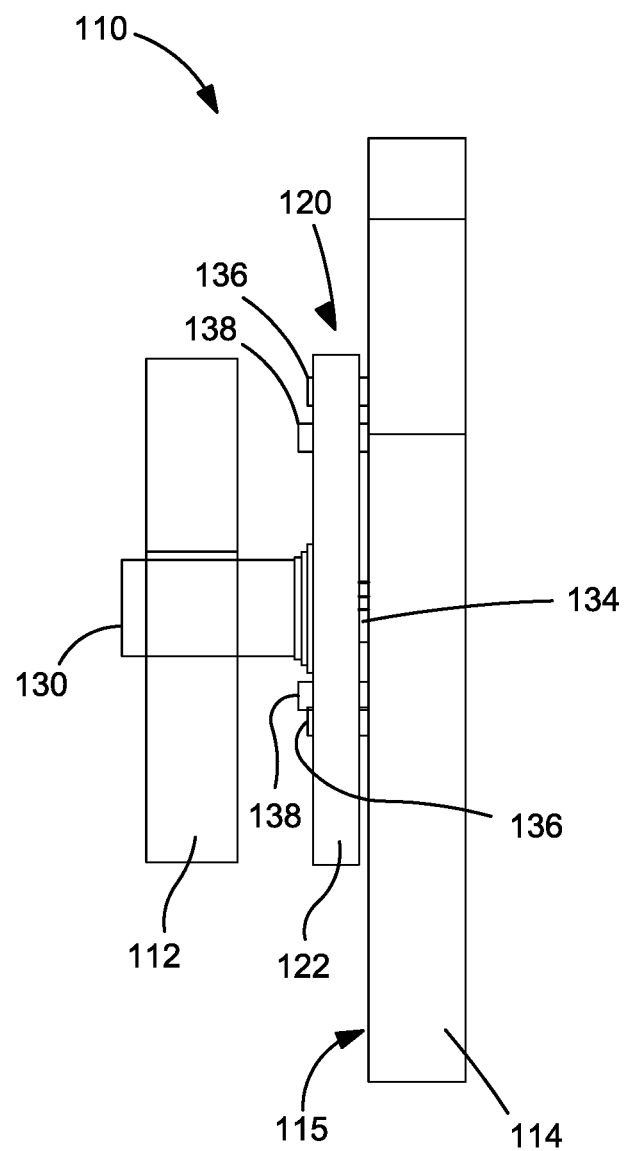
FIG. 6 is a cross-section view of the device of FIG. 4 shown coupling the angular position sensor (e.g. encoder) to a large diameter motor shaft.
Figure 7:
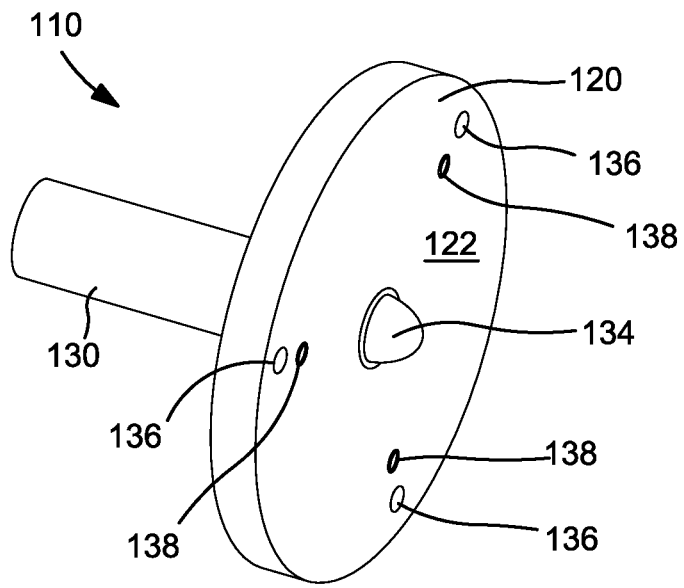
FIG. 7 is a perspective view of the device for mounting and aligning an angular position sensor (e.g. encoder) to a rotating motor shaft shown in FIG. 4.
Figure 8:
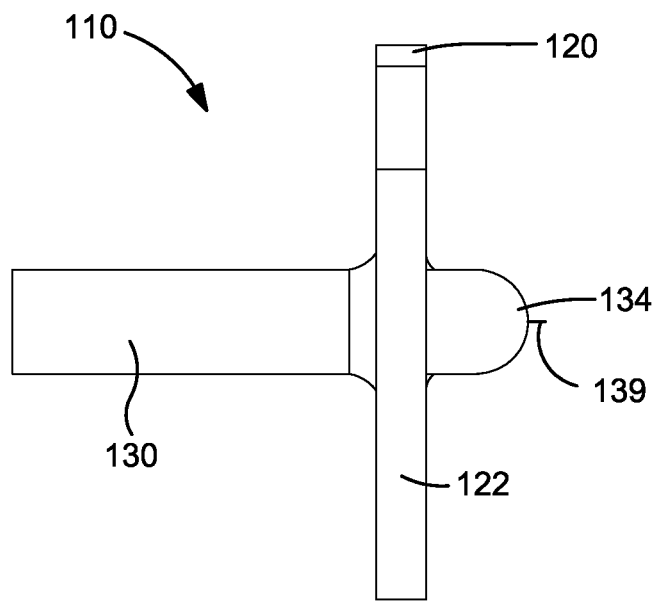
FIG. 8 is a side view of the device shown in FIG. 7.

Turning now to the drawings, and in particular FIGS. 1-3, there is shown an embodiment of the present device 10 for mounting an angular position sensor or encoder 12 to a rotating shaft 14. As seen therein, an alignment plate 20 is affixed or attached to an end face 15 of the rotating shaft 14. The illustrated alignment plate includes a central annular section 22 and a plurality of peripheral sections 24, 25, 26 extending radially outward from the central annular section 22. The alignment plate 20 also has a plurality of bores or apertures disposed within its body, including a central aperture 23 disposed in the central annular section 22 and a plurality of peripheral apertures 27, 28 disposed in the peripheral sections 24, 25, 26.

The device 10 also includes a coupling shaft 30 disposed through the central aperture 23 of the alignment plate 20 and a spherical joint 34 configured to be centrally placed or engaged in contact with the end face 15 of the rotating shaft 14. The distal end of coupling shaft 30 and the spherical joint 34 engage the end face 15 of the rotating shaft 14 while the proximal end of the coupling shaft 30 is configured to be connected to the angular position sensor or encoder 12. The diameter of the coupling shaft 30 is preferably selected to be compatible with the dimensions of commercial encoders. The spherical joint 34 minimizes stress between the rotating shaft 14 and the alignment plate 20 and simplifies the initial adjustments required when attaching the alignment plate 20 to the rotating shaft 14.

The illustrated device 10 is preferably fixed to the rotating shaft 14 with three bolts 36 disposed through peripheral apertures 27 in the peripheral sections 24, 25, 26 of the alignment plate 20. The fixing bolts 36 rigidly affix the alignment plate 20 to the rotating shaft 14 such that the fixing bolts 36 are radially offset from the shaft rotation axis and disposed the same radial distance from the axis and disposed symmetrically on the adjustment plate 20. Offsetting the fixing bolts 36 from the rotation axis and symmetrically disposing the fixing bolts 36 on the adjustment plate 20 maintains shaft balance and also mitigates problems arising from angular forces imparted via shaft rotation. The illustrated embodiment also shows a plurality of adjustment screws 38 extending from the peripheral apertures 28 in the alignment plate 20 towards the end face 15 of the rotating shaft 14. The adjustment screws 38 are preferably located proximate the fixing bolts 36 and at the same angular position as the fixing bolts relative to the centrally disposed coupling shaft 30. The adjustment screws 38 are used to make final balancing adjustments of the device to the rotating shaft such that the angular position sensor or encoder is rotationally aligned with the rotating shaft via movement of the adjusting screws.

An alternate embodiment of the present device 110 for mounting an angular position sensor or encoder 112 to a rotating shaft 114 is shown in FIGS. 4-8. As seen therein, an alignment plate 120 is an annular plate affixed or attached to an end face 115 of the rotating shaft 114. The illustrated alignment plate includes a body 122 which has a plurality of bores or apertures disposed therein, including a central aperture and a plurality of peripheral disposed apertures. The embodiment of the coupling device 110 shown in FIGS. 4-8 also includes a coupling shaft 130 disposed through the central aperture of the alignment plate 120. The coupling shaft 130 and the alignment plate may be constructed as an integral unit (i.e. one piece construction) or may be constructed as separate elements and assembled as generally described above.

The illustrated embodiment of coupling device 110, shown in FIGS. 4-8 also includes a spherical joint 134 configured to be centrally placed or engaged in contact with the end face 115 of the rotating shaft 114. Engagement between the spherical joint 134 and the end face of the rotating shaft 114 may be direct engagement between the spherical end face of the spherical joint 134 to the end face 115 of the rotating shaft 114 or may be via a protruding alignment pin 139 extending from the end of the spherical joint 134 which engages a corresponding seat in the end face 115 of the rotating shaft 114, as seen generally in FIGS. 7-8.

The distal end of coupling shaft 130 and the spherical joint 134 engage the end face 115 of the rotating shaft 114 while the proximal end of the coupling shaft 130 is configured to be connected to the angular position sensor or encoder 112. Like the embodiment shown in FIGS. 1-3, this embodiment is also preferably fixed to the rotating shaft 114 with three fixing bolts 136 disposed through peripheral apertures. Adjustment screws 138 are also preferably located proximate the fixing bolts 36 and generally at the same angular position as the fixing bolts relative to the centrally disposed coupling shaft 130. The adjustment screws 138 are used for final balancing adjustments of the device to the rotating shaft such that the angular position sensor is rotationally aligned with the rotating shaft via movement of the adjusting screws.

The illustrated coupling devices 10, 110 are particularly useful in applications where the rotating shaft is a motor shaft and the diameter of the motor shaft is large. Specifically, the illustrated adjustable devices 10, 100 are most useful where the diameter of the motor shaft is preferably greater than the diameter of the angular sensor or encoder and thus larger than the diameter of the coupling shaft.

While the present invention has been described with reference to a preferred embodiment or embodiments, it is understood that numerous additions, changes and omissions can be made without departing from the spirit and scope of the present invention as set forth in the appended claims.

What is claimed is:

1. A device for mounting an angular position sensor to a rotating shaft comprising:
   an alignment plate configured to be affixed to an end face of the rotating shaft, the alignment plate having a central aperture;
   a coupling shaft disposed through the central aperture of the alignment plate, the coupling shaft having a first end configured to engage the end face of the rotating shaft and a second end configured to engage with the angular position sensor;
   a spherical joint coupled to first end of the coupling shaft and centrally disposed in contact with the end face of the rotating shaft; and
   a plurality of adjustment screws extending from the alignment plate towards the end face of the rotating shaft;
   wherein the diameter of the coupling shaft is less than the diameter of the rotating shaft.

2. The device of claim 1 wherein the angular position sensor is rotationally aligned with the rotating shaft via movement of the adjusting screws.

3. The device of claim 2 further comprising a plurality of bolts and wherein the alignment plate is configured to be affixed to the end face of the rotating shaft, via the plurality of bolts.

4. The device of claim 3 wherein the alignment plate further comprises a central annular section and a plurality of peripheral sections extending radially outward from the central annular section, the plurality of peripheral sections each having one or more apertures.

5. The device of claim 4 wherein the bolts are disposed through the apertures in the plurality of peripheral sections of the alignment plate to the end face of the rotating shaft to affix the alignment plate to the end face of the rotating shaft.

6. The device of claim 4 wherein the adjusting screws are disposed through the apertures in the plurality of peripheral sections of the alignment plate and engage the end face of the rotating shaft.

* * * * *